(12) United States Patent
Kuroyanagi et al.

(10) Patent No.: US 11,519,215 B2
(45) Date of Patent: Dec. 6, 2022

(54) SENSOR BRACKET

(71) Applicant: AISIN CORPORATION, Kariya (JP)

(72) Inventors: Kazuma Kuroyanagi, Kariya (JP);
Wataru Hattori, Kariya (JP); Hironori Koeda, Kariya (JP)

(73) Assignee: AISIN CORPORATION, Kariya (JP)

( * ) Notice: Subject to any disclaimer, the term of this patent is extended or adjusted under 35 U.S.C. 154(b) by 389 days.

(21) Appl. No.: 16/876,172

(22) Filed: May 18, 2020

(65) Prior Publication Data

US 2020/0370359 A1 Nov. 26, 2020

(30) Foreign Application Priority Data

May 22, 2019 (JP) .............................. JP2019-096022

(51) Int. Cl.
*E05F 15/73* (2015.01)
*B60R 19/48* (2006.01)

(52) U.S. Cl.
CPC ............ *E05F 15/73* (2015.01); *B60R 19/483* (2013.01); *E05Y 2400/44* (2013.01); *E05Y 2600/528* (2013.01); *E05Y 2600/626* (2013.01)

(58) Field of Classification Search
CPC .............. B60R 19/483; E05Y 2600/528; E05Y 2600/626; E05Y 2400/44
See application file for complete search history.

(56) References Cited

U.S. PATENT DOCUMENTS

| | | | | |
|---|---|---|---|---|
| 9,463,776 B2* | 10/2016 | Gunreben | ............... | E05F 15/73 |
| 9,787,306 B2* | 10/2017 | Muzzetto | ................. | G01D 5/24 |
| 10,563,447 B2* | 2/2020 | Gunreben | ............... | E05F 15/73 |
| 10,833,676 B2* | 11/2020 | Hieltscher | ............... | E05F 15/73 |
| 2011/0128018 A1* | 6/2011 | Reime | ..................... | E05F 15/46 |
| | | | | 174/70 R |
| 2018/0348015 A1* | 12/2018 | Takayanagi | .......... | H03K 17/955 |

FOREIGN PATENT DOCUMENTS

| | | |
|---|---|---|
| JP | 2017-173121 A | 9/2017 |
| JP | 2018-204958 A | 12/2018 |

* cited by examiner

*Primary Examiner* — D Glenn Dayoan
*Assistant Examiner* — Melissa Ann Bonifazi
(74) *Attorney, Agent, or Firm* — Oblon, McClelland, Maier & Neustadt, L.L.P.

(57) ABSTRACT

A sensor bracket for mounting, on a vehicle, a capacitance sensor in which a loop-shaped electric wire serving as a sensor electrode extends from a sensor main body includes a bracket main body on which the sensor main body is arranged with the electric wire looping back so as to extend in parallel with each other at a constant distance from each other, and a plate spring portion being supported by the bracket main body in a cantilever manner, having, on a tip side, a hooking portion disposed to which the electric wire can be hooked, and providing the electric wire hooked to the hooking portion with tension.

6 Claims, 10 Drawing Sheets

US 11,519,215 B2

SENSOR BRACKET

CROSS REFERENCE TO RELATED APPLICATIONS

This application is based on and claims priority under 35 U.S.C. § 119 to Japanese Patent Application 2019-096022, filed on May 22, 2019, the entire content of which is incorporated herein by reference.

TECHNICAL FIELD

This disclosure generally relates to a sensor bracket.

BACKGROUND DISCUSSION

There have conventionally been proposed capacitance sensors each of which includes two sensor electrodes, a plurality of tubular bodies into which electric wires constituting the sensor electrodes are inserted, and a plurality of holder members that hold the tubular bodies in parallel with one another, and detects presence or absence of an operation input to a vehicle (see, for example, JP2017-173121A (Reference 1)). In Reference 1, restricting relative movements among tubular bodies by holder members keeps constant distances (interaxial distances) among electric wires extending inside the tubular bodies. It is asserted that, since this configuration enables change in capacitance due to change in the distance between the electric wires to be suppressed and intended sensitivity of a capacitance sensor to be thereby maintained, it is allowed to appropriately detect an operation input to a vehicle.

For the above-described capacitance sensor, it is required to prepare a plurality of tubular bodies and a plurality of holder members as separate members, insert electric wires into the tubular bodies, and subsequently perform assembly so as to hold the tubular bodies in parallel with one another with the plurality of holder members. Thus, the number of components increases and a configuration of the capacitance sensor sometimes becomes complicated. On the other hand, it is conceivable to constitute a sensor bracket on which holding grooves for holding electric wires are formed and with which the above-described holder members are integrated. Although such a configuration enables time and effort for inserting electric wires into tubular bodies to be saved and the number of components to be suppressed, the electric wires being bent in the holding grooves or slipping out of the holding grooves sometimes cause distance between the electric wires to be changed and erroneous detection to occur.

A need thus exists for a sensor bracket which is not susceptible to the drawback mentioned above.

SUMMARY

A sensor bracket according to this disclosure is a sensor bracket for mounting, on a vehicle, a capacitance sensor in which a loop-shaped electric wire serving as a sensor electrode extends from a sensor main body.

The sensor bracket includes: a bracket main body on which the sensor main body is arranged with the electric wire looping back so as to extend in parallel with each other at a constant distance from each other; and a plate spring portion being supported by the bracket main body in a cantilever manner, having, on a tip side, a hooking portion disposed to which the electric wire can be hooked, and providing the electric wire hooked to the hooking portion with tension.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be explained with reference to the attached drawings.

Figure 1:
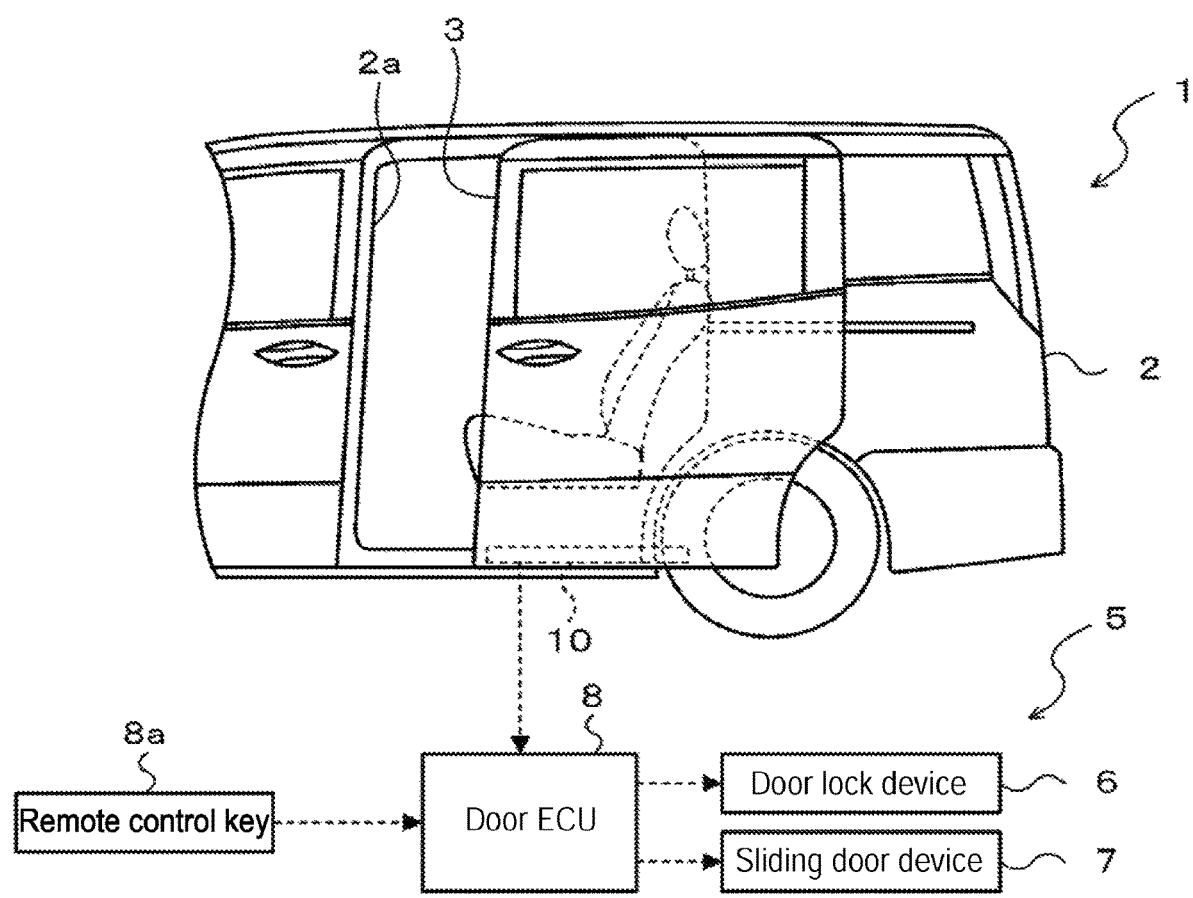
FIG. 1 is an explanatory diagram illustrating an external appearance of a vehicle 1 and a configuration of a door opening and closing device 5.
Figure 2:
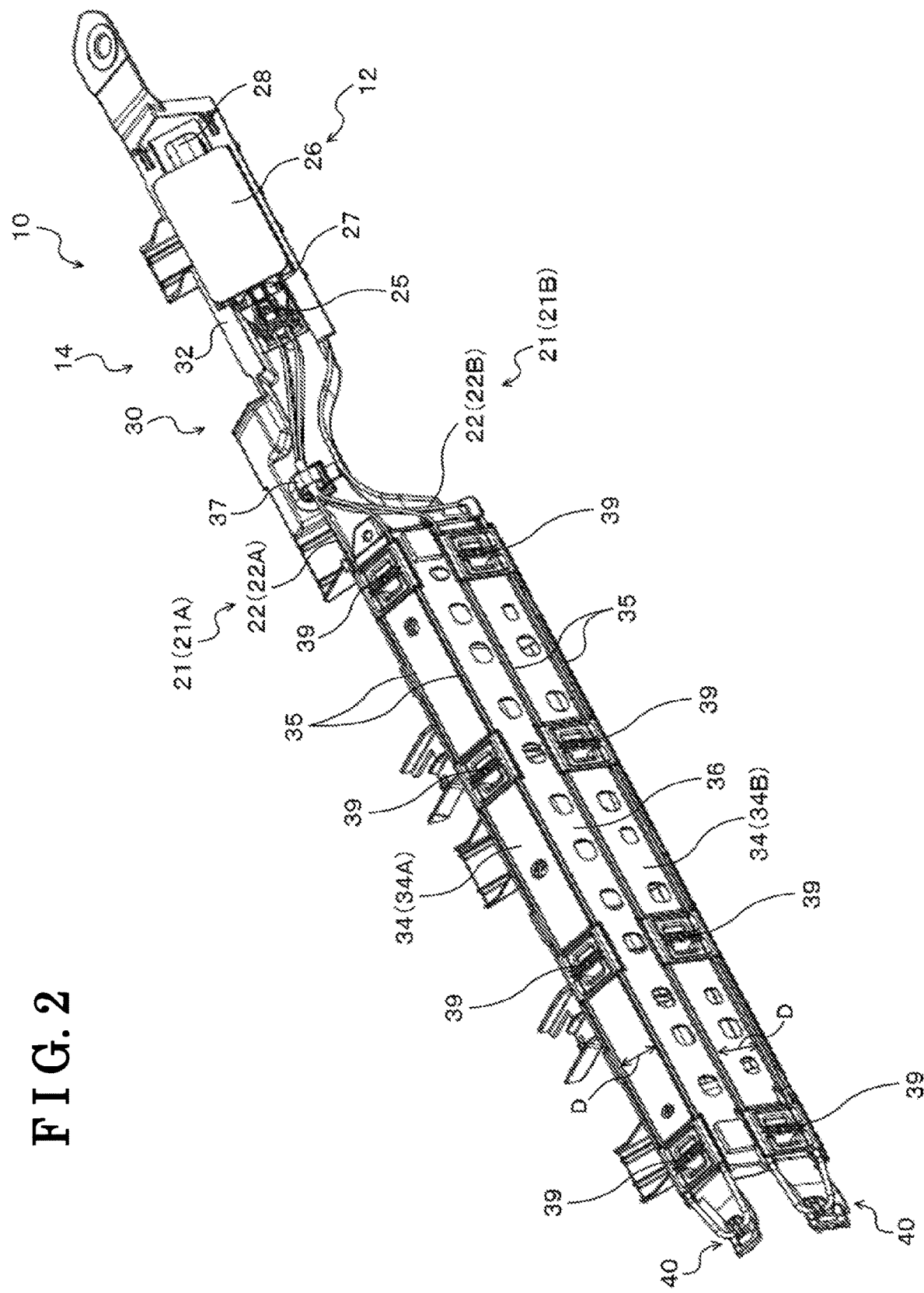
FIG. 2 is an external perspective view of a sensor unit 10.
Figure 3:
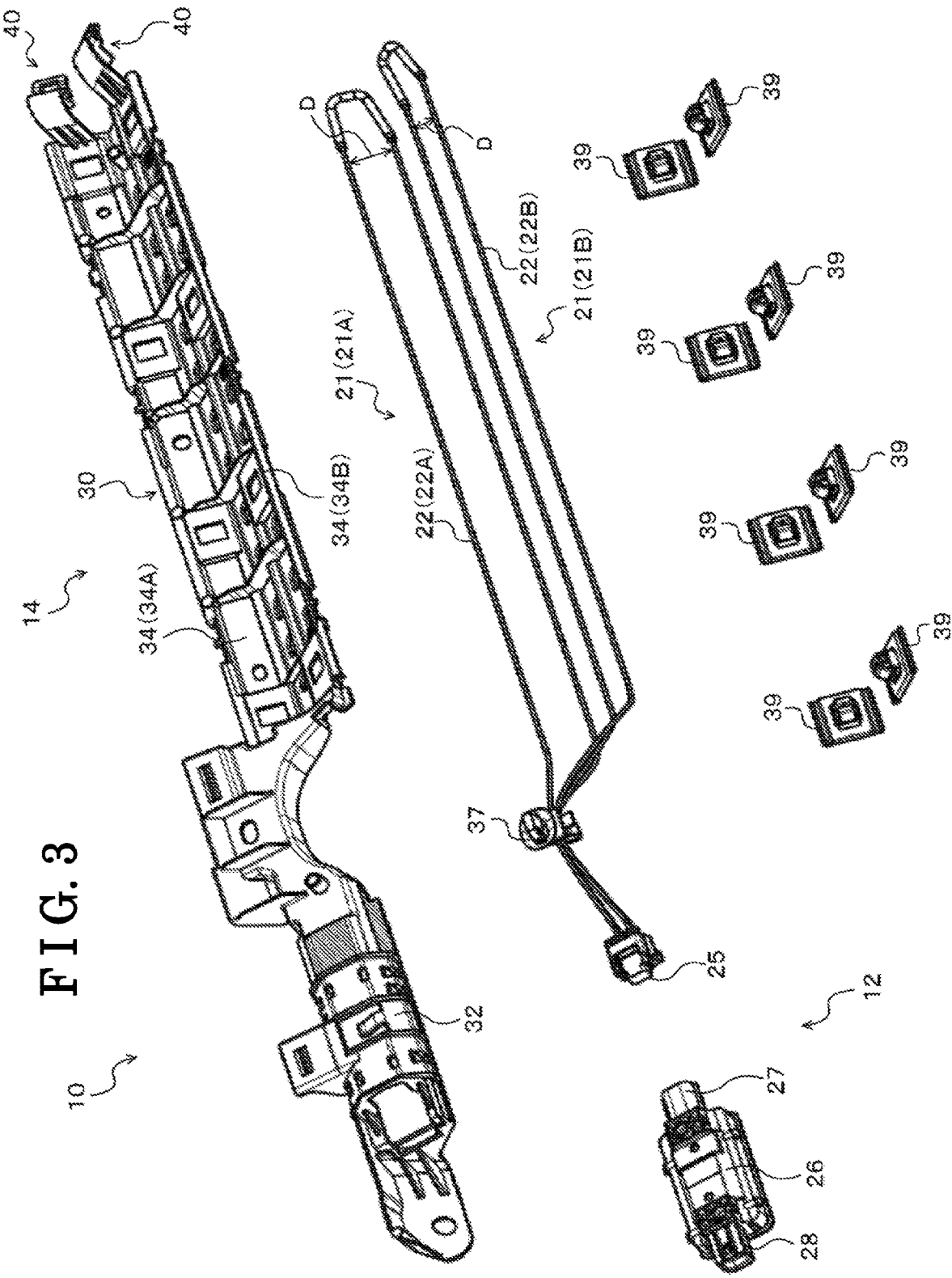
FIG. 3 is an exploded perspective view of main constituent elements of the sensor unit 10.
Figure 4:
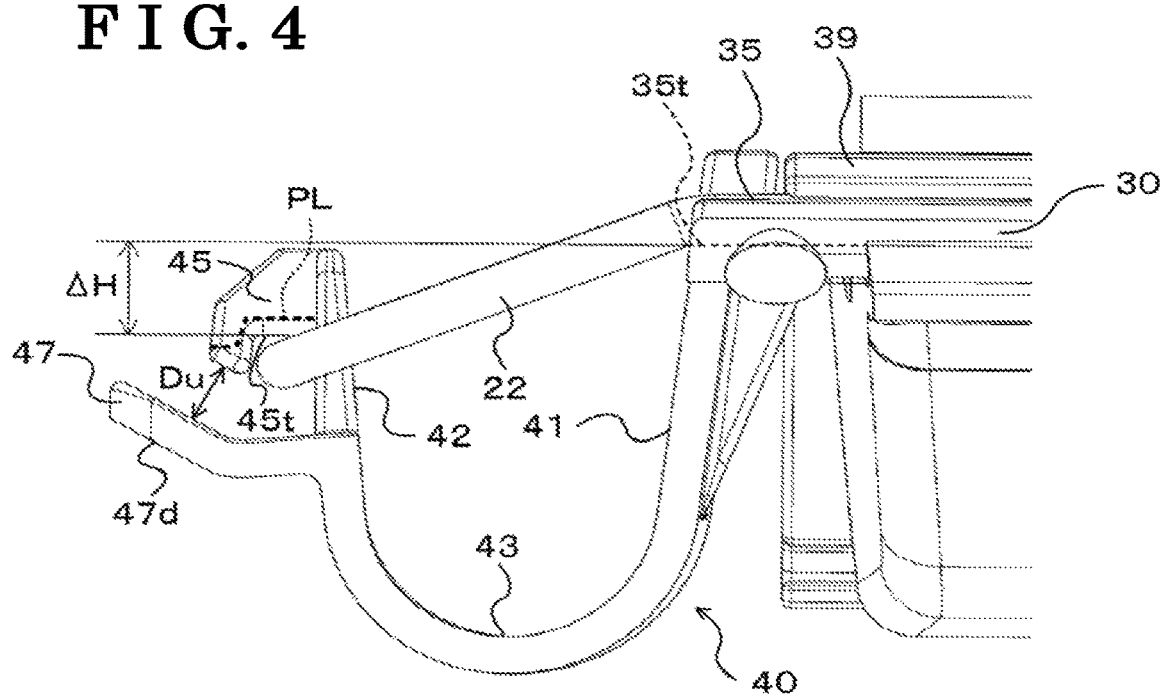
FIG. 4 is a side view of a plate spring portion 40 to which an electric wire 22 is hooked.
Figure 5:
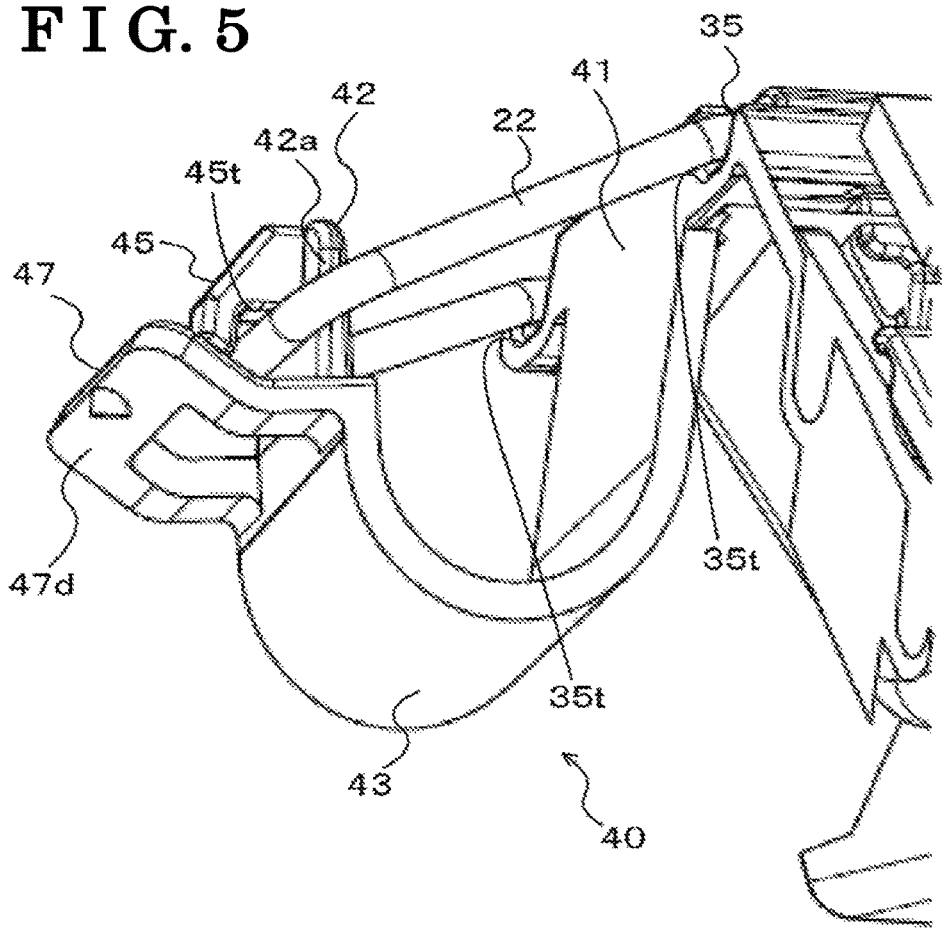
FIG. 5 is a perspective view of the plate spring portion 40 to which the electric wire 22 is hooked.
Figure 6:
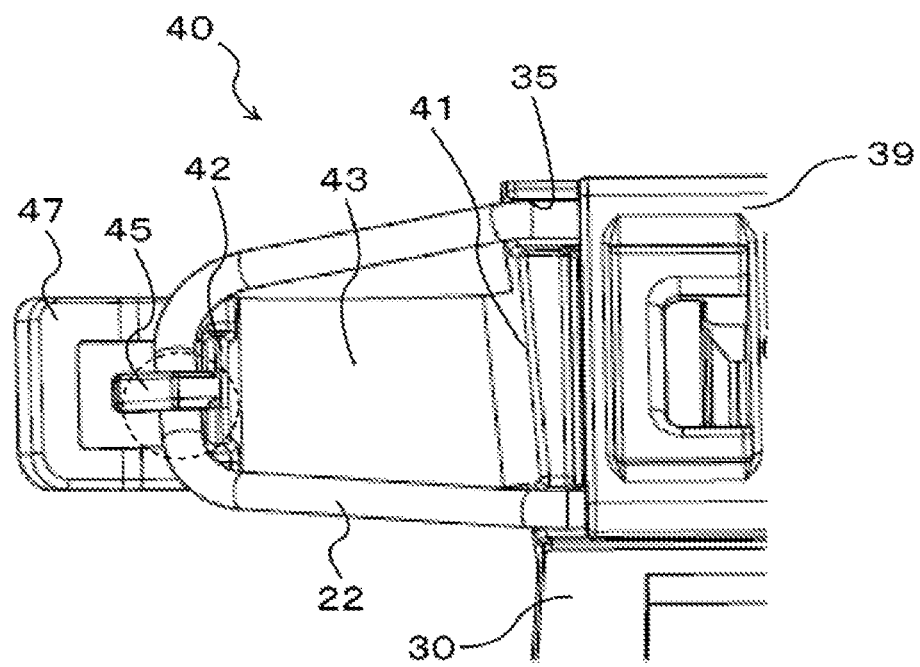
FIG. 6 is a plan view of the plate spring portion 40 to which the electric wire 22 is hooked.
Figure 7:
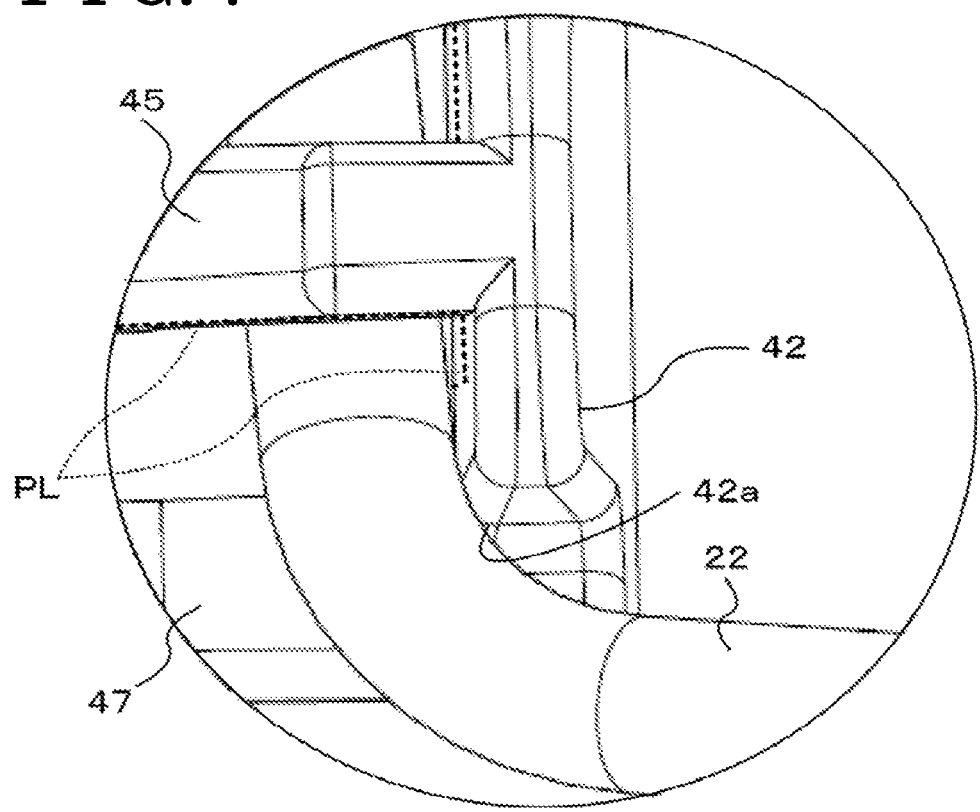
FIG. 7 is an enlarged view of an area encircled by a dotted line in FIG. 6.

FIG. 1 is an explanatory diagram illustrating an external appearance of a vehicle 1 and a configuration of a door opening and closing device 5, FIG. 2 is an external perspective view of a sensor unit 10, and FIG. 3 is an exploded perspective view of main constituent elements of the sensor unit 10. FIG. 4 is a side view of a plate spring portion 40 to which an electric wire 22 is hooked, FIG. 5 is a perspective view of the plate spring portion 40 to which the electric wire 22 is hooked, FIG. 6 is a plan view of the plate spring portion 40 to which the electric wire 22 is hooked, and FIG. 7 is an enlarged view of an area encircled by a dotted line in FIG. 6. In FIG. 3, main constituent elements of the sensor unit 10 illustrated in FIG. 2 are illustrated, and illustration of some of the constituent elements is omitted.

As illustrated in FIG. 1, the vehicle 1 includes a body 2 that has an opening portion 2a to which a not-illustrated slide rail is disposed in the vehicle front-rear direction, a sliding door 3 that is slidably supported on the slide rail, and the door opening and closing device 5 for opening and closing the sliding door 3. The door opening and closing device 5 includes a door lock device 6, a sliding door device 7, the sensor unit 10, and a door ECU 8. The door lock device 6, driven by an actuator, locks and unlocks the sliding door 3. The sliding door device 7, driven by an actuator, slides the sliding door 3 along the slide rail. The door ECU 8 accepts input of a signal from the sensor unit 10 and a signal from a wireless remote control key 8*a*, such as a so-called smart key, and also outputs control signals to the door lock device 6 and the sliding door device 7. The door ECU 8, for example, while detecting that the remote control key 8*a* is present within a predetermined range, controls the door lock device 6 and the sliding door device 7 to open the sliding door 3 in the closed state or close the sliding door 3 in the open state, based on a detection signal from the sensor unit 10.

The sensor unit 10 is a capacitance sensor that is disposed in the sliding door 3 and that has spaces on the outer side of and below the sliding door 3 set as detection ranges and detects movement of the shin or the toe of a user to instruct opening and closing of the sliding door 3. As illustrated in FIGS. 2 and 3, the sensor unit 10 includes a sensor portion 12 and a sensor bracket 14 made of resin. The sensor unit 10 may be configured to be mounted in the body 2.

As illustrated in FIGS. 2 and 3, the sensor portion 12 includes a first sensor electrode 21A and a second sensor electrode 21B and a sensor main body 26. The first sensor electrode 21A and the second sensor electrode 21B are independent sensor electrodes, and the first sensor electrode 21A and the second sensor electrode 21B have a first electric wire 22A and a second electric wire 22B, respectively. Both the first electric wire 22A and the second electric wire 22B are loop-shaped electric wires both ends of each of which are connected to a connector portion 25. The sensor main body 26 includes an input connector portion 27 to which the connector portion 25 is connected and an output connector portion 28 to which a not-illustrated wiring linked to the door ECU 8 is connected and has a not-illustrated detection circuit built-in. The detection circuit of the sensor main body 26 is configured to detect respective capacitance values of the first sensor electrode 21A and the second sensor electrode 21B and output, to the door ECU 8, a detected value by the first sensor electrode 21A and a detected value by the second sensor electrode 21B as separate detection signals. In the following description, unless specifically distinguished, the first sensor electrode 21A and the second sensor electrode 21B are referred to as sensor electrodes 21 and the first electric wire 22A and the second electric wire 22B are referred to as electric wires 22.

The sensor bracket 14 includes a straight line-shaped (long ruler-shaped) bracket main body 30 that extends in the vehicle front-rear direction and two plate spring portions 40 that are supported at one end of the bracket main body 30 in a cantilever manner. In this embodiment, the plate spring portions 40 and the bracket main body 30 are produced as an integrated molded product by means of, for example, injection molding using molds. The bracket main body 30 includes a main body holding portion 32 that is disposed on the other end side and into which the sensor main body 26 can be fitted, a long flat plate-shaped first electric wire holding portion 34A and second electric wire holding portion 34B that extend in the longitudinal direction (the vehicle front-rear direction), and a long flat plate-shaped joining portion 36 that joins the first electric wire holding portion 34A and the second electric wire holding portion 34B to each other. The main body holding portion 32 holds the sensor main body 26, which is arranged in such a way that the input connector portion 27 and the output connector portion 28 face the one end side and the other end side of the bracket main body 30, respectively. The joining portion 36 joins the first electric wire holding portion 34A and the second electric wire holding portion 34B to each other in such a way that the first electric wire holding portion 34A and the second electric wire holding portion 34B are spaced apart by a predetermined distance from each other and also form a predetermined angle in accordance with the shape of the sliding door 3 (the body 2) therebetween.

The first electric wire holding portion 34A has a pair of recess-shaped holding grooves 35 for holding the first electric wires 22A formed, the holding grooves 35 extending along both edges of a long flat plate-shaped plate surface in the longitudinal direction in parallel with each other at a constant distance D from each other. The first electric wire holding portion 34A houses and holds the first electric wire 22A in the holding grooves 35 in such a way that the first electric wire 22A is exposed from and loops back to the one end of the bracket main body 30. The second electric wire holding portion 34B, as with the first electric wire holding portion 34A, has a pair of recess-shaped holding grooves 35 formed, the holding grooves 35 extending in parallel with each other at the constant distance D from each other, and houses and holds the second electric wire 22B in the holding grooves 35 in such a way that the second electric wire 22B is exposed from and loops back to the one end of the bracket main body 30. Thus, each of the loop-shaped electric wires 22 (the first electric wire 22A and the second electric wire 22B) is held so as to extend back and forth in parallel with each other at the constant distance D from each other and be exposed from and loop back to the holding grooves 35 at the one end of the bracket main body 30.

On each of the first electric wire holding portion 34A and the second electric wire holding portion 34B, electric wire hold-down members 39 that cover the holding grooves 35 are attached at a plurality of places (for example, four places) at a constant interval. The electric wire hold-down members 39, by being attached after the electric wires 22 having been housed in the holding grooves 35, serve as members that hold down the electric wires 22 lest the electric wires 22 slip out of the holding grooves 35. As described above, since the first electric wire holding portion 34A and the second electric wire holding portion 34B have similar configurations in which the holding grooves 35 and the electric wire hold-down members 39 are disposed in a similar manner and the similar plate spring portions 40 are also disposed at the one ends thereof, the first electric wire holding portion 34A and the second electric wire holding portion 34B are referred to as electric wire holding portions 34 unless specifically distinguished. Between the main body holding portion 32 and the electric wire holding portions 34, the first electric wire 22A and the second electric wire 22B are held by a holding clip 37.

Each of the plate spring portions 40 is disposed so as to project outward in the longitudinal direction from the one end of one of the electric wire holding portions 34 of the bracket main body 30. The plate spring portion 40 includes a base end portion 41 that projects so as to be substantially orthogonal to the plane of one of the electric wire holding portions 34 of the bracket main body 30, a tip end portion 42 that extends so as to face the base end portion 41, and an intermediate portion 43 that extends curving in a circular-arc shape from the base end portion 41 to the tip end portion 42 and is formed into a substantially U-shape when viewed from the side in an elastically deformable manner. On the outer surface, which is on the opposite side to the inner surface facing the base end portion 41, of the tip end portion 42 of the plate spring portion 40, a hooking portion 45 to which a loop-back part of one of the loop-shaped electric wires 22, which are exposed from the holding grooves 35, can be hooked and a pressure receiving portion 47 that can receive pressing force (pressing operation force) in a direction in which the plate spring portion 40 is bent in such a way that the tip end portion 42 comes closer to the base end portion 41 (the bracket main body 30 side) are disposed.

The hooking portion 45 of each of the plate spring portions 40 is disposed so as to project in a hook shape from the outer surface of the tip end portion 42 and forms, in combination with the tip end portion 42, a recess-shaped portion that is recessed to the side opposite to the side on which corresponding holding grooves 35 of the bracket main body 30 are formed in the depth direction (the up-and-down direction in FIG. 4) of the holding grooves 35. The hooking portion 45 is disposed at a location below groove bottom surfaces 35t of the holding grooves 35 in the depth direction of the holding grooves 35. Specifically, the hooking portion 45 is disposed in such a way that a bottom surface 45t of the recess-shaped portion of the hooking portion 45 is located below the groove bottom surfaces 35t by ΔH in the depth direction of the holding grooves 35. ΔH is set at, for example, approximately several mm in order to, when one of the electric wires 22 is hooked to the hooking portion 45, press down parallelly extending parts of the electric wire 22 on the groove bottom surfaces 35t of the holding grooves 35 and, at the same time, not cause excessive tension to be exerted on the electric wire 22 and breaking of the electric wire 22 to occur. Thus, the plate spring portion 40 is able to provide the electric wire 22 with tension lest the electric wire 22 slip out of corresponding holding grooves 35 or be bent inside the holding grooves 35. The tip end portion 42 has corner portions 42a formed into rounded shapes, the corner portions 42a being contact parts that come into contact with the electric wire 22 (see FIG. 7). The tip end portion 42 has a parting line PL (see a dotted line in FIGS. 4 and 7) formed in a part where the parting line PL does not appear on the corner portions 42a and that does not come into contact with the electric wire 22, the parting line PL being generated at a boundary between molds. Thus, it is allowed to prevent the electric wire 22 that is hooked to the hooking portion 45 from coming into contact with burrs generated at the parting line PL and being damaged or broken.

The pressure receiving portion 47 of each of the plate spring portions 40 is formed into a shape that is erected so as to be substantially orthogonal to the outer surface of the tip end portion 42 and in which the tip is tilted (bent) to be directed toward the hooking portion 45 side (the upper side in FIG. 4). The pressure receiving portion 47 is formed spaced apart from the hooking portion 45 by a distance Du (see FIG. 4) allowing one of the electric wires 22 to be accepted (inserted) into a space therebetween. The pressure receiving portion 47 functions as a pressure receiving surface when a lower surface 47d of the tilted part receives pressing force bending the plate spring portion 40.

Figure 8A:
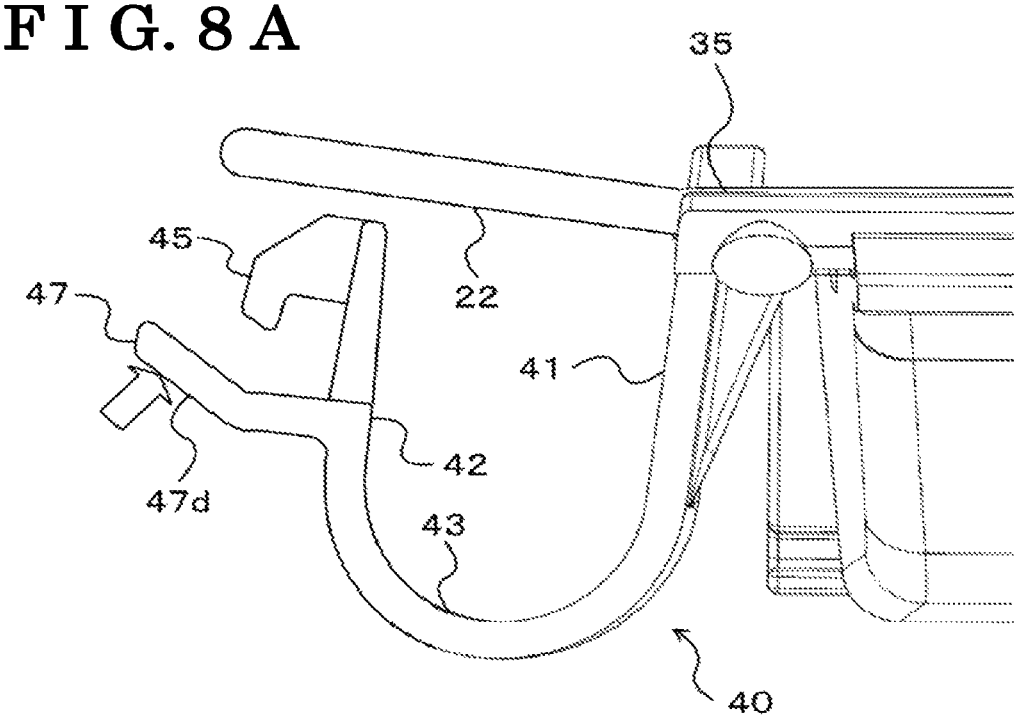
FIGS. 8A and 8B are explanatory diagrams illustrating a process in which the electric wire 22 is hooked to a hooking portion 45.
Figure 8B:
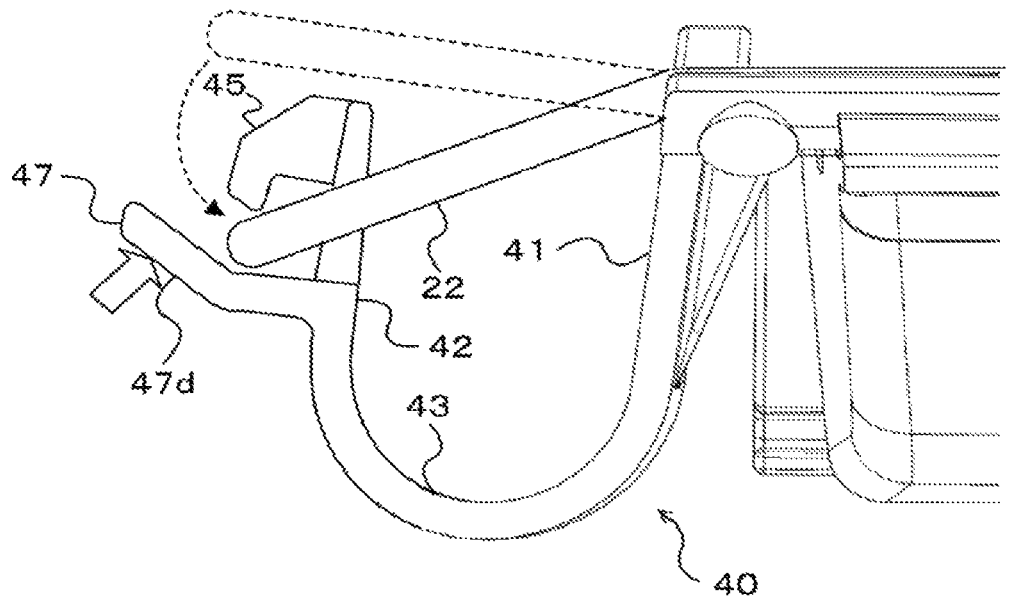

In the sensor unit 10 configured as described above, assembly of the sensor portion 12 to the sensor bracket 14 is performed as follows. FIGS. 8A and 8B are explanatory diagrams illustrating a process in which an electric wire 22 is hooked to a hooking portion 45. First, an operator arranges the sensor main body 26 on the main body holding portion 32 of the bracket main body 30, mounts the holding clip 37 that is made to hold the electric wires 22 on the bracket main body 30, and also places the electric wires 22 in the holding grooves 35. Next, as illustrated in FIG. 8A, the operator, by pressing the lower surface 47d of the pressure receiving portion 47 of each of the plate spring portion 40 (see an arrow), brings the plate spring portion 40 into a state of being bent in such a way that the tip end portion 42 of the plate spring portion 40 comes closer to the base end portion 41 thereof. Since this state causes the hooking portion 45 to come closer to the bracket main body 30, it is facilitated to insert one of the electric wires 22 between the pressure receiving portion 47 and the hooking portion 45. As illustrated in FIG. 8B, the operator inserts the loop-back part of the loop-shaped electric wire 22 between the pressure receiving portion 47 and the hooking portion 45 and subsequently releases the pressing of the pressure receiving portion 47. Since these operations cause the electric wires 22 to be hooked to the hooking portions 45 and be brought into a state of being provided with tension by bias from the plate spring portions 40 (see FIG. 4), the electric wires 22 are appropriately held in the holding grooves 35 by the tension. Succeedingly, attaching the electric wire hold-down members 39 on the electric wire holding portions 34 completes the assembly of the sensor portion 12 to the sensor bracket 14. Attaching the electric wire hold-down members 39 on the electric wire holding portions 34 enables the electric wires 22 to be surely prevented from slipping off. The sensor portion 12 using the electric wires 22 as the sensor electrodes 21 as described above can be adjusted to have desirable detection sensitivity by setting the capacitance thereof to be variable by means of changing the constant distance D of the electric wires 22. However, when either of the electric wires 22 slips out of a holding groove 35 or is bent and the distance of the electric wire 22 thus changes, such as partially becoming wider or narrower, detected values from the sensor electrode 21 become unstable, causing erroneous detection to sometimes occur. In this embodiment, since it is allowed to, by providing the electric wires 22 with tension by means of bias from the plate spring portions 40, retain the constant distance D of the electric wires 22 appropriately, it is allowed to stabilize detected values and prevent erroneous detection from occurring. The assembly operation may, without being limited to a configuration in which an operator performs the assembly operation, be configured to be performed by an operation machine that provides the pressure receiving portions 47 with pressing force and hooks the electric wires 22 to the hooking portions 45.

The sensor bracket 14 of the sensor unit 10 that has been described thus far includes the plate spring portions 40 that are supported by the bracket main body 30 in a cantilever manner and that provide the electric wires 22 hooked to the hooking portions 45 disposed on the tip end portion 42 sides with tension. Thus, a simple constitution in which the plate spring portions 40 are disposed to the bracket main body 30 enables a state in which each of the electric wires 22, without being bent, extends back and forth in parallel with each other at a constant distance from each other to be retained appropriately. Since, therefore, the sensor unit 10 is able to maintain desired detection sensitivity (capacitance), it is allowed to prevent erroneous detection from occurring.

Since the hooking portions 45 (the bottom surfaces 45t) are disposed at locations below the groove bottom surfaces 35t in the depth directions of the holding grooves 35, it is allowed to provide the electric wires 22 with appropriate tension that prevents the electric wires 22 from slipping out of the holding grooves 35.

Since each of the plate spring portions 40 has the pressure receiving portion 47 disposed spaced apart from the hooking portion 45 by a distance allowing one of the electric wires 22 to be accepted into a space therebetween, it is allowed to, while bending the plate spring portion 40 by exerting pressing force to the pressure receiving portion 47, easily hook the electric wire 22 to the hooking portion 45.

Since the bracket main body 30 and the plate spring portions 40 are formed into an integrated molded product made of resin, it is allowed to save time and effort to fix the plate spring portions 40 to the bracket main body 30 and omit members for use in the fixing. Since there is no possibility that misalignment of the plate spring portions 40 to the bracket main body 30 occurs, it is allowed to continuously provide the electric wires 22 with tension appropriately.

Since the plate spring portions 40 have the parting lines PL formed on parts other than contact parts that come into contact with the electric wires 22 hooked to the hooking portions 45, it is allowed to prevent damage or breaking of the electric wires 22 that may occur due to contact with, for example, burrs at the parting lines PL from occurring.

Although, in this embodiment, the plate spring portions 40 are configured to have the parting lines PL formed on parts other than contact parts that come into contact with the electric wires 22, this disclosure is not limited to the configuration, and the plate spring portions 40 may be configured to have the parting lines PL formed on the contact parts. However, since it is required to remove burrs and the like at the parting lines PL sufficiently, it is preferable to configure the sensor unit 10 in a manner as described in this embodiment.

Although, in this embodiment, the bracket main body 30 and the plate spring portions 40 are configured to be formed into an integrated molded product made of resin, this disclosure is not limited to the configuration, and the bracket main body 30 and the plate spring portions 40 may be formed as separate components and the plate spring portions 40 may be configured to be fixed to the bracket main body 30, using fastening members, such as screws. The plate spring portions 40 formed as separate components may be made of metal instead of resin.

Although, in this embodiment, a pressure receiving portion 47 is configured to be disposed to each plate spring portion 40, this disclosure is not limited to the configuration, and no pressure receiving portion 47 may be configured to be disposed. When configured in such a manner, it is only necessary to, while bending the plate spring portion 40 by pressing a place of the tip end portion 42 that does not interfere with hooking of one of the electric wires 22 to the hooking portion 45, hook the electric wire 22 to the hooking portion 45.

Although, in this embodiment, the hooking portions 45 are configured to be disposed at locations below the groove bottom surfaces 35t of the holding grooves 35, this disclosure is not limited to the configuration, and the hooking portions 45 may be configured to be disposed at locations as high as the groove bottom surfaces 35t.

Although, in this embodiment, holding grooves 35 are configured to be disposed on each electric wire holding portion 34, this disclosure is not limited to the configuration, and no holding grooves 35 may be configured to be disposed. When configured in such a manner, it may be configured such that a plurality of holding clips 37 are disposed in place of the holding grooves 35 and the electric wires 22 are held by the holding clips 37. In such a case, it is only necessary to provide the electric wires 22 with tension within sections between the holding clips 37, and the configuration of the plate spring portions 40 is thus not limited to a configuration in which the plate spring portions 40 project outward from the bracket main body 30 and may be a configuration in which the plate spring portions 40 are contained in the bracket main body 30.

Although, in this embodiment, the sensor unit 10 including two sensor electrodes 21, namely the first sensor electrode 21A and the second sensor electrode 21B, is exemplified, this disclosure is not limited to the configuration, and the sensor unit 10 may be configured to include three or more sensor electrodes 21 or include only one sensor electrode 21. The configuration of the sensor electrodes 21 is not limited to a configuration in which the distances of the electric wires 22 of the sensor electrodes 21 are the same distance (the predetermined distance D) and may be a configuration in which the electric wires 22 have different distances.

Figure 9A:
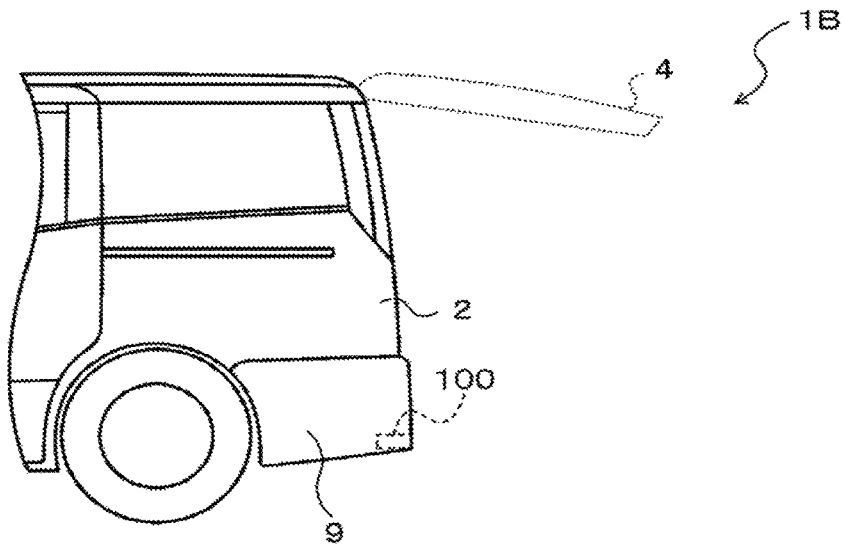
FIGS. 9A and 9B are explanatory diagrams illustrating an external appearance of a vehicle 1B of a variation and a configuration of a door opening and closing device 5B.
Figure 9B:
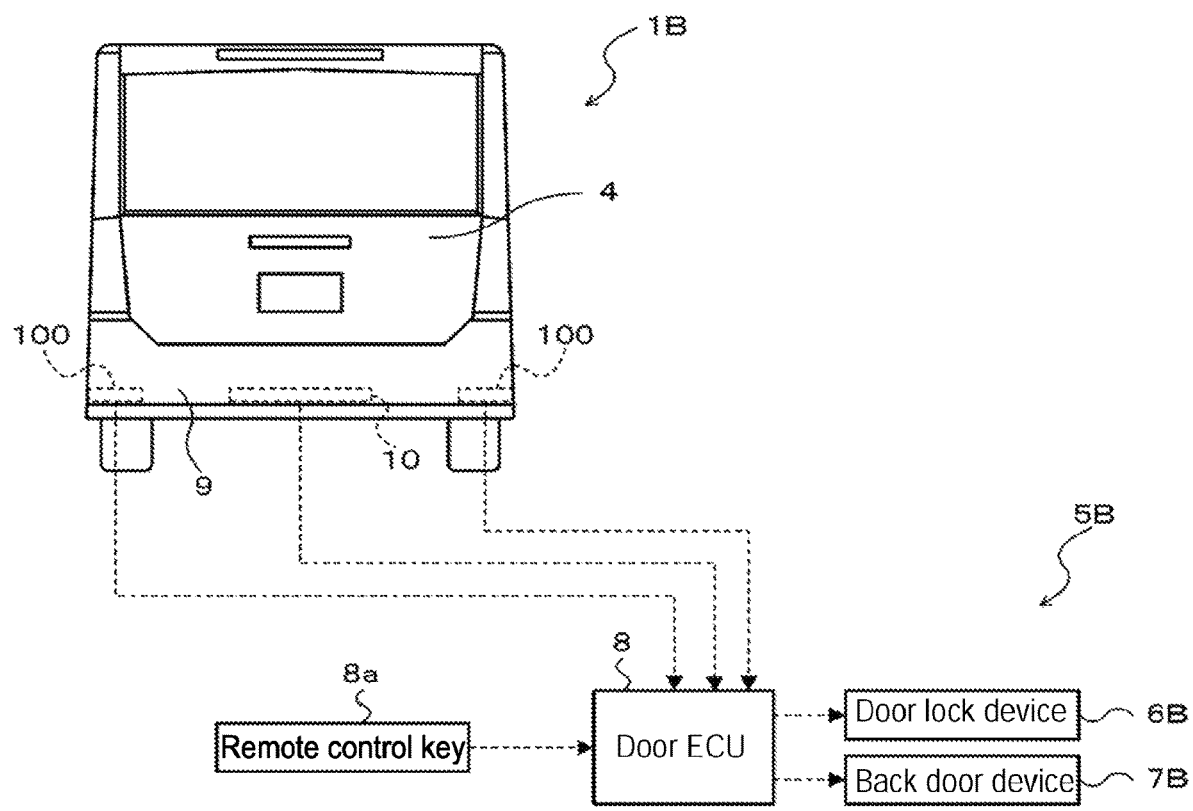
Figure 10:
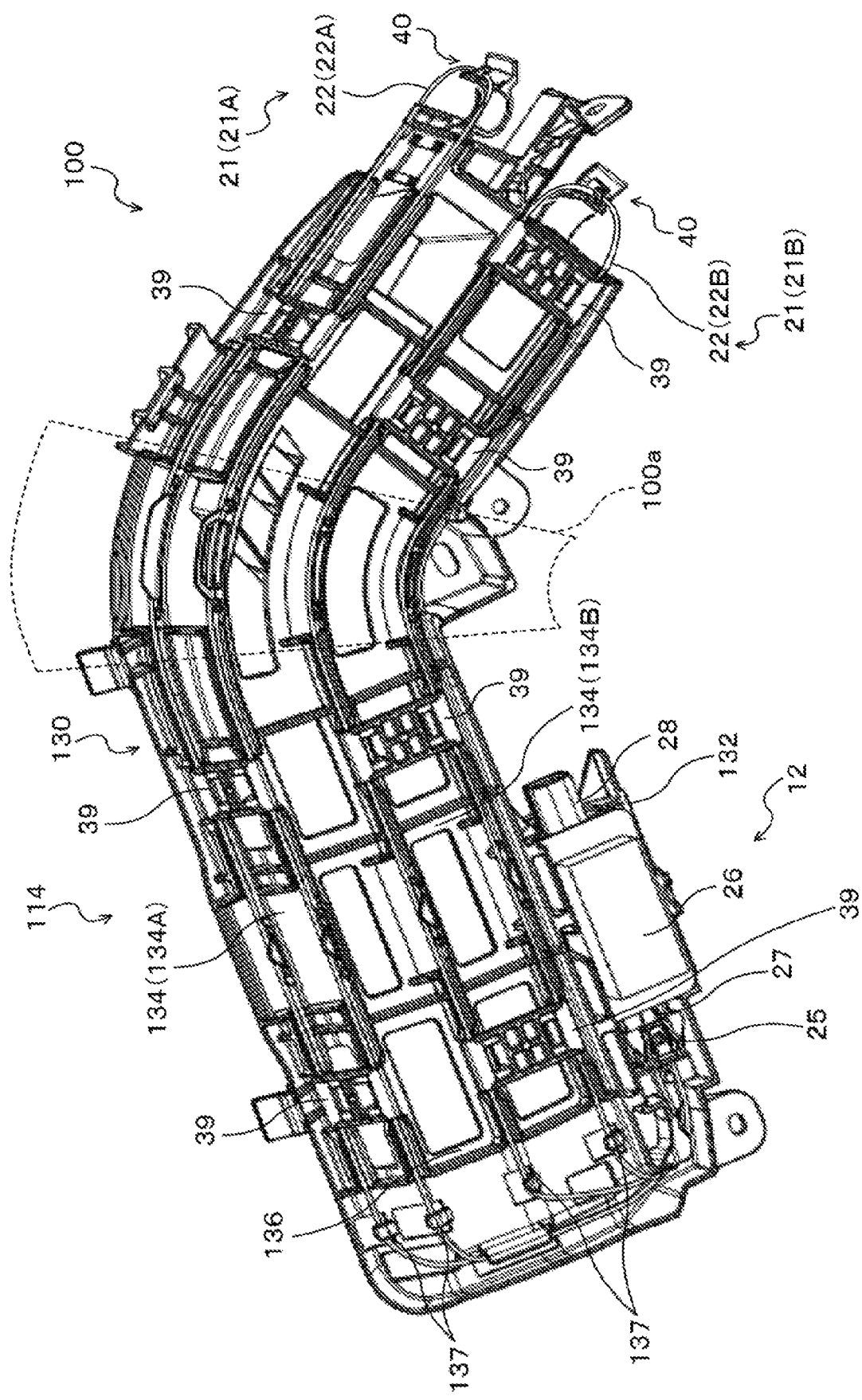
FIG. 10 is an external perspective view of a sensor unit 100 of the variation.
Figure 11:
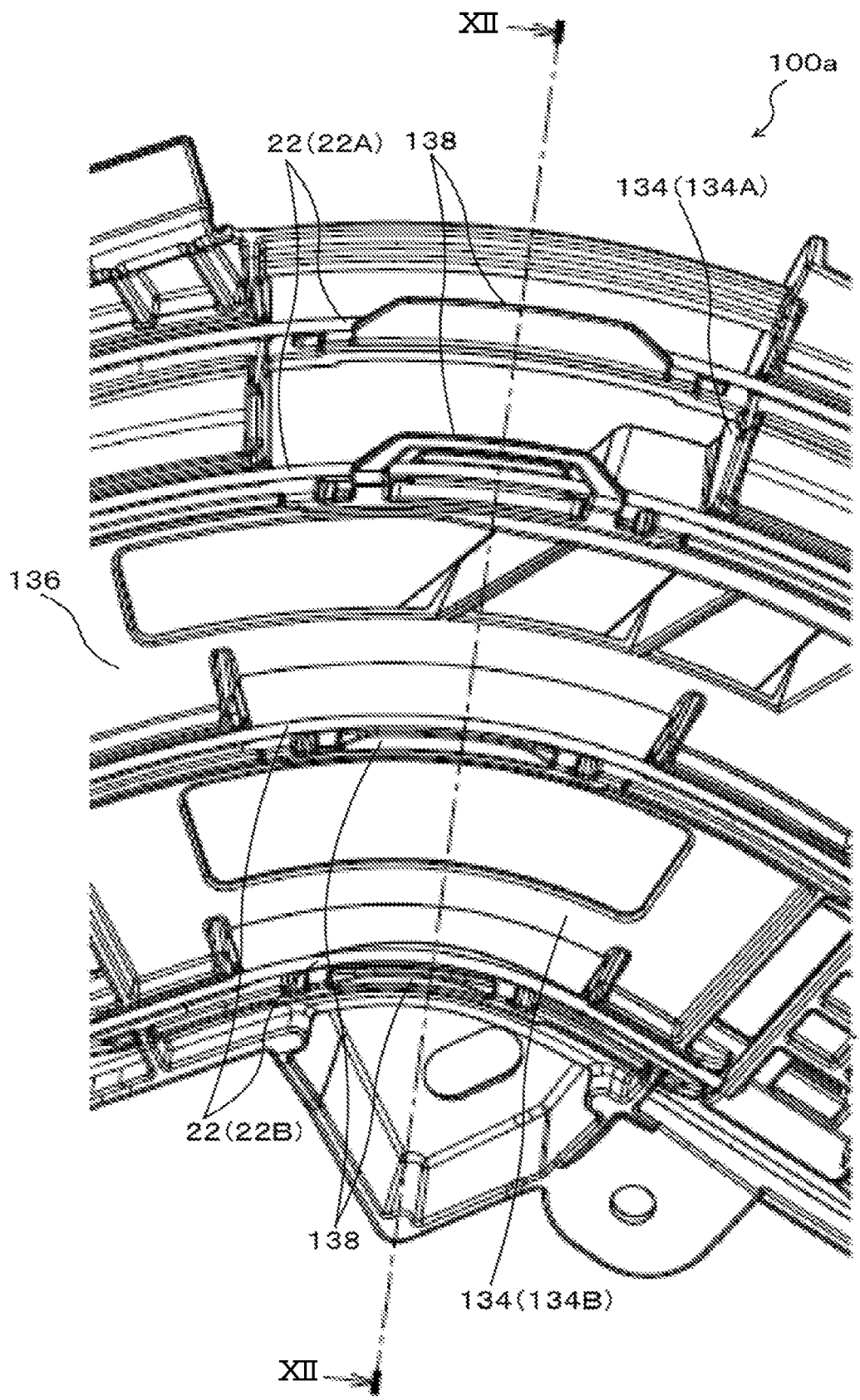
FIG. 11 is an enlarged view of a curved part 100a of the sensor unit 100.
Figure 12:
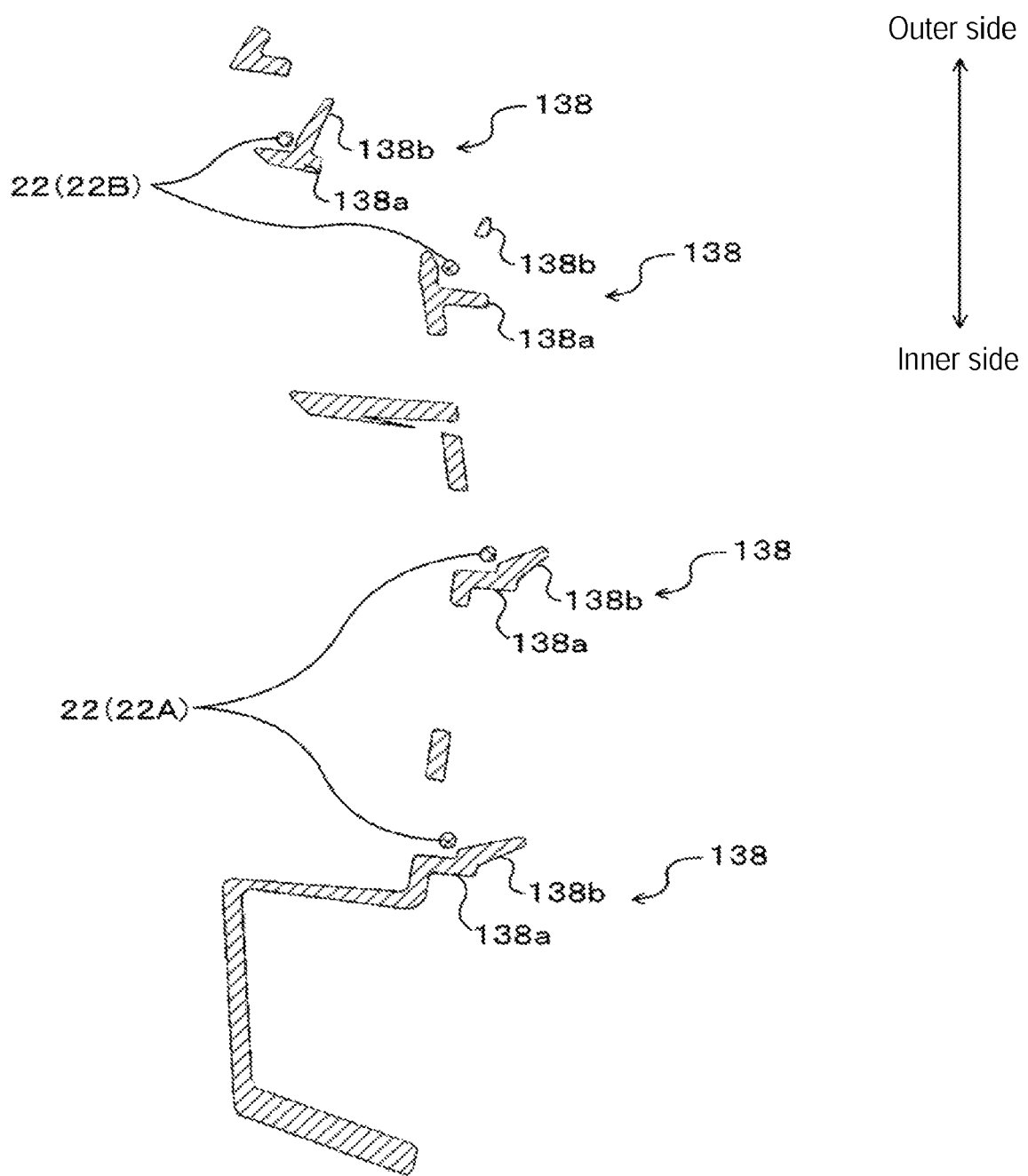
FIG. 12 is a cross-sectional view taken along the line XII-XII of FIG. 11.

Although, in this embodiment, the sensor unit 10 is configured to detect instructions to open and close the sliding door 3, this disclosure is not limited to the configuration, and the sensor unit 10 may be configured to detect, for example, instructions to open and close a back door and sensor units for the detection may be disposed in the rear bumper or the back door. FIGS. 9A and 9B are explanatory diagrams illustrating an external appearance of a vehicle 1B of a variation and a configuration of a door opening and closing device 5B, and FIG. 10 is an external perspective view of a sensor unit 100 of the variation. FIG. 11 is an enlarged view of a curved part 100a of the sensor unit 100, and FIG. 12 is a cross-sectional view taken along the line XII-XII of FIG. 11. In FIG. 9A, a side view of a rear part of the vehicle 1B is illustrated, and, in FIG. 9B, a rear view of the vehicle 1B and a configuration of the door opening and closing device 5B are illustrated. In this variation, the same signs are assigned to the same constituent components as those in the embodiment and a description thereof will be omitted.

As illustrated in FIGS. 9A and 9B, the vehicle 1B of this variation includes a swing-up type back door 4 that is supported to a body 2 by hinges in a freely openable and closable manner, a door lock device 6B that, driven by an actuator, locks and unlocks the back door 4, and a back door device 7B that, by converting rotational motion of an actuator to linear motion and thereby performing expansion and extraction motion, opens and closes the back door 4. On the vehicle 1B, as capacitance sensors, a sensor unit 10 is disposed at the center of a lower portion of a rear bumper 9 and sensor units 100 are disposed at both right and left ends of the lower portion. Since the sensor unit 10 disposed at the center has the same configuration as that of the embodiment, a description thereof will be omitted. A door ECU 8 of the vehicle 1B, for example, while detecting that a remote control key 8a is present within a predetermined range, controls the door lock device 6B and the back door device 7B to open the back door 4 in the closed state or close the back door 4 in the open state, based on detection signals from the sensor units 10 and 100.

As with the sensor unit 10, each of the sensor units 100 includes a sensor portion 12 and a sensor bracket 114 that holds the sensor portion 12 and that is made of resin. The sensor bracket 114 of this variation includes a bracket main body 130 that is formed into a curved shape that curves in accordance with the shape of either of right and left end portions of the rear bumper 9, which are places at which the sensor units 100 are mounted, and two plate spring portions 40 that are disposed at one end of the bracket main body 130. The bracket main body 130 includes a main body holding portion 132, a curve-shaped first electric wire holding portion 134A and second electric wire holding portion 134B, and a curve-shaped joining portion 136 that joins the first electric wire holding portion 134A and the second electric wire holding portion 134B to each other in such a way that the first electric wire holding portion 134A and the second electric wire holding portion 134B are spaced apart by a predetermined distance from each other and also form a predetermined angle therebetween. The main body holding portion 132 is disposed along the inner periphery on the other end side of the curve-shaped second electric wire holding portion 134B.

On the first electric wire holding portion 134A of each of the sensor units 100, two holding clips 137 that hold one of electric wires 22 extending from and looping back to a connector portion 25, two fulcrum portions 138 that are disposed on the curved part 100a and serve as fulcrum points about which the electric wire 22 curves in accordance with the curved shape, and a plate spring portion 40 that is disposed so as to project outward from one end side of the first electric wire holding portion 134A are disposed. As illustrated in FIG. 12, the fulcrum portions 138 are respectively disposed at locations on the inner side (the lower side in FIG. 12) of curving parts of the electric wire 22 and disposed spaced apart from each other by the same distance (constant distance) as the distance between the holding clips 137. Each of the fulcrum portions 138 has a shape including a vertical wall portion 138a that is formed so as to rise substantially perpendicularly to a surface of the first electric wire holding portion 134A and an eaves portion 138b that is formed so as to be bent from the upper edge of the vertical wall portion 138a toward the outer side of the curved part. The plate spring portion 40 is configured in a similar manner to the embodiment, that is, configured in such a way that a loop-back part of the electric wire 22 can be hooked to the plate spring portion 40 and tension can thereby be provided to the electric wire 22. On the second electric wire holding portion 134B, as with the first electric wire holding portion 134A, two holding clips 137, two fulcrum portions 138, and a plate spring portion 40 are disposed, and a loop-back part of the other one of the electric wires 22 can be hooked to the plate spring portion 40. Note that the reason for the shapes of the four fulcrum portions 138 being slightly different from one another is that releasability from molds at the time of injection molding is taken into account and interference with other components when the sensor unit 100 is mounted to the vehicle 1B is to be prevented from occurring. Note also that, on the first electric wire holding portion 134A and the second electric wire holding portion 134B, no holding groove 35 is formed, differing from the embodiment.

In each of the sensor units 100 of this variation, which are configured as described above, assembly of the sensor portion 12 to the sensor bracket 114 is performed as follows. First, an operator arranges a sensor main body 26 on the main body holding portion 132 of the bracket main body 130 and makes the holding clip 37 hold the electric wires 22. Next, as with the embodiment, the operator, by pressing a pressure receiving portion 47 of each of the plate spring portions 40, brings the plate spring portion 40 into a state of being bent, and, while placing one of the electric wires 22 on the fulcrum portions 138, inserts the loop-back part of the electric wire 22 between the pressure receiving portion 47 and a hooking portion 45 and subsequently releases the pressing of the pressure receiving portion 47. These operations cause the electric wires 22 to be hooked to the hooking portions 45, and bias from the plate spring portions 40 causes the electric wires 22 to be provided with tension. Thus, it is allowed to appropriately retain a state in which each of the electric wires 22 extends back and forth in parallel with each other at a constant distance from each other in a curved manner. Succeedingly, mounting electric wire hold-down members 39 on the electric wire holding portions 134 completes the assembly of the sensor portion 12 to the sensor bracket 114.

Since this configuration enables the electric wires 22 to appropriately maintain a constant distance even when the bracket main body 130 is curve-shaped, it is allowed to stabilize detection precision. When the electric wires 22 are configured to be housed in curve-shaped holding grooves, the electric wires 22 sometimes slip out of the holding grooves when tension from the plate spring portions 40 is provided unless the electric wires 22 are held down. Since, in this variation, it is only necessary to place the electric wires 22 on the fulcrum portions 138 instead of housing the electric wires 22 in holding grooves, it is allowed to easily perform assembly of the sensor portion 12 to the sensor bracket 114.

The capacitance sensor essentially includes a sensor electrode and either of the above-described sensor brackets. Since the capacitance sensor includes either of the above-described sensor brackets, it is allowed to appropriately retain a state in which a loop-shaped electric wire, without being bent, extends back and forth in parallel with each other at a constant distance from each other. This configuration enables intended sensitivity of the capacitance sensor to be maintained and erroneous detection to be prevented from occurring.

Correspondence relations between principal elements in the embodiment and principal elements of this disclosure described in the Summary will be explained. In the embodiment, each of the electric wires 22 (the first electric wire 22A and the second electric wire 22B), each of the sensor electrodes 21 (the first sensor electrode 21A and the second sensor electrode 21B), the sensor unit 10, the sensor bracket 14, the bracket main body 30, each of the hooking portions 45, and each of the plate spring portions 40 correspond to an "electric wire", a "sensor electrode", a "capacitance sensor", a "sensor bracket", a "bracket main body", a "hooking portion", and a "plate spring portion", respectively. The holding grooves 35 correspond to "holding grooves". Each of the pressure receiving portions 47 corresponds to a "pressure receiving portion". The fulcrum portions 138 correspond to "fulcrum portions".

Since the embodiment is an example for specifically describing an embodiment for practicing this disclosure described in the Summary, the correspondence relations between the principal elements in the embodiment and the principal elements of this disclosure described in the Summary do not limit the elements of this disclosure described in the Summary. That is, interpretation of this disclosure described in the Summary should be performed based on the description thereof, and the embodiment is no more than a specific example of this disclosure described in the Summary.

The best mode for practicing this disclosure is described above through an embodiment thereof, but this disclosure is not limited to the above embodiment, and it is needless to say that this disclosure can be practiced in various modes without departing from the scope of the present disclosure.

This disclosure is able to be used in the manufacturing industry of sensor brackets of capacitance sensors and the like.

A sensor bracket according to this disclosure is a sensor bracket for mounting, on a vehicle, a capacitance sensor in which a loop-shaped electric wire serving as a sensor electrode extends from a sensor main body.

The sensor bracket includes: a bracket main body on which the sensor main body is arranged with the electric wire looping back so as to extend back and forth in parallel with each other at a constant distance from each other; and a plate spring portion being supported by the bracket main body in a cantilever manner, having, on a tip side, a hooking portion disposed to which the electric wire can be hooked, and providing the electric wire hooked to the hooking portion with tension.

The sensor bracket according to this disclosure includes a plate spring portion being supported by the bracket main body in a cantilever manner, having, on the tip side, a hooking portion disposed to which an electric wire can be hooked, and providing the electric wire hooked to the hooking portion with tension. Thus, a simple configuration in which the plate spring portion is disposed to the bracket main body enables a state in which a loop-shaped electric wire, being prevented from being bent, extends back and forth in parallel with each other at a constant distance from each other to be retained appropriately. Since this configuration enables a capacitance of a capacitance sensor to be kept constant and intended sensitivity of the capacitance sensor to be maintained, it is allowed to prevent erroneous detection from occurring.

In the sensor bracket according to this disclosure, the bracket main body may be formed into a straight line shape and have a pair of straight line-shaped holding grooves disposed that extend in parallel with each other at the constant distance from each other so as to house and hold parts of the electric wire that extend back and forth in parallel with each other, and the plate spring portion may be disposed projecting outward from the bracket main body in such a way that a loop-back part of the electric wire can be hooked to the hooking portion and have the hooking portion disposed at a location below groove bottoms of the holding grooves in a depth direction of the holding grooves. Since this configuration enables tension to be provided so as to press down the electric wire on the groove bottoms, it is allowed to appropriately prevent the electric wire from slipping out of the holding grooves.

In the sensor bracket according to this disclosure, the bracket main body may be formed into a curved shape and have a pair of fulcrum portions disposed at the constant distance from each other, the fulcrum portions serving as fulcrum points about which the electric wire curves on inner sides of curved parts among parts of the electric wire that extend in parallel with each other, and the plate spring portion may be disposed projecting outward from the bracket main body in such a way that a loop-back part of the electric wire can be hooked to the hooking portion. Even when the bracket main body is formed into a curved shape, this configuration, while causing the electric wire to be bent in accordance with the curved shape, enables the electric wire to be provided with appropriate tension. Since, on the curved part, it is only necessary to place the electric wire on the fulcrum portions, it is allowed to easily perform arrangement of the electric wire on the sensor bracket.

In the sensor bracket according to this disclosure, the plate spring portion may have a pressure receiving portion disposed on a tip side, being spaced apart from the hooking portion by a distance allowing the electric wire to be accepted into a space between the pressure receiving portion and the hooking portion, the pressure receiving portion receiving pressing force in a direction in which the plate spring portion is bent in such a way that the tip side comes closer to the bracket main body. This configuration enables, by exerting pressing force to the pressure receiving portion and thereby bringing the plate spring portion into a state of being bent, the electric wire to be easily hooked to the hooking portion.

In the sensor bracket according to this disclosure, the bracket main body and the plate spring portion may be formed into an integrated molded product made of resin. This configuration enables time and effort for fixing the plate spring portion to the bracket main body to be saved and members for use in the fixing to be omitted. Since there is no possibility that misalignment of the plate spring portion to the bracket main body occurs, it is allowed to continuously provide the electric wire with tension appropriately.

In the sensor bracket according to this disclosure, the plate spring portion may be an injection-molded product that has a parting line formed on a part other than a contact part with which the electric wire hooked to the hooking portion comes into contact. This configuration enables the electric wire to be prevented from being damaged or broken due to contact with the parting line.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sensor bracket for mounting, on a vehicle, a capacitance sensor in which a loop-shaped electric wire serving as a sensor electrode extends from a sensor main body, comprising:
   a bracket main body on which the sensor main body is arranged with the electric wire looping back so as to extend in parallel with each other at a constant distance from each other; and
   a plate spring portion being supported by the bracket main body in a cantilever manner, having, on a tip side, a hooking portion disposed to which the electric wire can be hooked, and providing the electric wire hooked to the hooking portion with tension.

2. The sensor bracket according to claim 1, wherein
   the bracket main body is formed into a straight line shape and has a pair of straight line-shaped holding grooves disposed that extend in parallel with each other at the constant distance from each other so as to house and hold parts of the electric wire that extend in parallel with each other, and
   the plate spring portion is disposed projecting outward from the bracket main body in such a way that a loop-back part of the electric wire can be hooked to the hooking portion and has the hooking portion disposed at a location below groove bottoms of the holding grooves in a depth direction of the holding grooves.

3. The sensor bracket according to claim 1, wherein
   the bracket main body is formed into a curved shape and has a pair of fulcrum portions disposed at the constant distance from each other, the fulcrum portions serving as fulcrum points about which the electric wire curves on inner sides of curved parts among parts of the electric wire that extend in parallel with each other, and
   the plate spring portion is disposed projecting outward from the bracket main body in such a way that a loop-back part of the electric wire can be hooked to the hooking portion.

4. The sensor bracket according to claim 1, wherein
   the plate spring portion has a pressure receiving portion disposed on a tip side, being spaced apart from the hooking portion by a distance allowing the electric wire to be accepted into a space between the pressure receiving portion and the hooking portion, the pressure receiving portion receiving pressing force in a direction in which the plate spring portion is bent in such a way that the tip side comes closer to the bracket main body.

5. The sensor bracket according to claim 1, wherein the bracket main body and the plate spring portion are formed into an integrated molded product made of resin.

6. The sensor bracket according to claim 1, wherein the plate spring portion is an injection-molded product that has a parting line formed on a part other than a contact part with which the electric wire hooked to the hooking portion comes into contact.

* * * * *